Aug. 22, 1961 W. C. CHAPMAN 2,997,329
VEHICLE BODY STEP PLATE AND ROCKER PANEL ASSEMBLY
Filed April 20, 1959
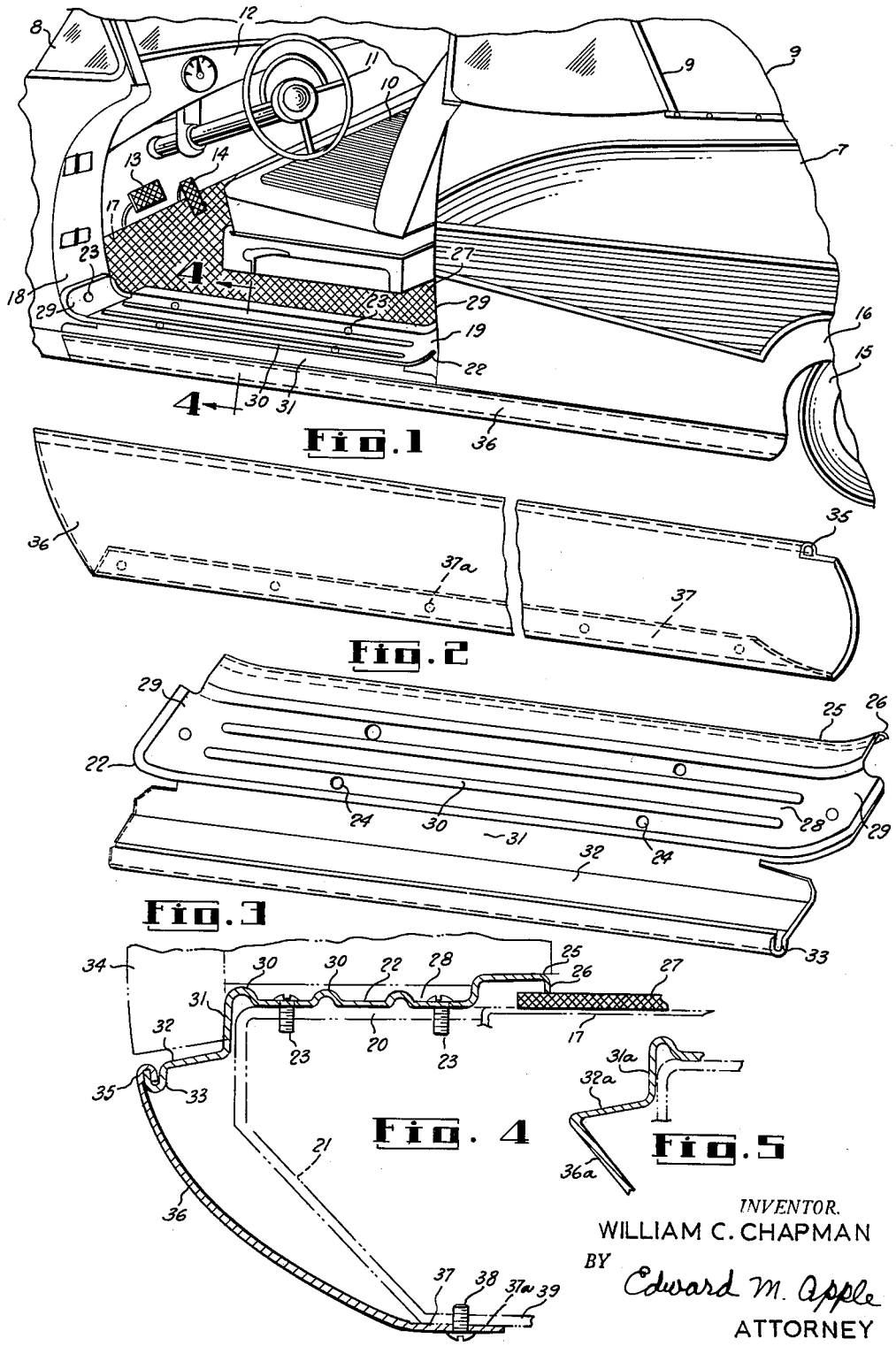
INVENTOR.
WILLIAM C. CHAPMAN
BY Edward M. Apple
ATTORNEY United States Patent Office 2,997,329
Patented Aug. 22, 1961

2,997,329
VEHICLE BODY STEP PLATE AND ROCKER PANEL ASSEMBLY
William C. Chapman, 6061 Brighton Road, Brighton, Mich.
Filed Apr. 20, 1959, Ser. No. 807,354
3 Claims. (Cl. 296—1)

This invention relates to vehicle bodies and has particular reference to a combined step plate and rocker panel assembly.

An object of the invention is to generally improve automotive vehicle bodies, and to provide an assembly, which may be built into new car bodies at the factory, or which may be merchandised by the car dealers as an accessory for old or new cars.

Another object of the invention is to provide a device of the character indicated, which will not only decorate and dress up the vehicle body, but will re-inforce the body structure and provide a combined step plate, door stop, rocker panel or trim molding support, and a car rug hold down element, which is simple in construction, economical to manufacture and efficient in operation.

A further object of the invention is to provide means for making ready and economical repairs to rocker panels and the like which have been damaged by rust, corrosion or collision.

A further object of the invention is to provide novel means for securing to the body trim moldings and the like, which previously had to be secured thereto by clips or similar means.

In conventional automobile bodies the portions thereof below the doors and extending between the fenders, are referred to as rocker panels. These panels, because of their close proximity to the ground, and because of their constant exposure to the elements, often corrode and rust away and have to be replaced.

The replacement of a rocker panel, previously entailed the cutting away of the entire panel, or at least a certain section thereof, which cut away section had to be replaced by fitting and welding into position the new section. This required the expenditure of considerable labor and materials, and left the vehicle body in a more or less weakened condition, and often times with an unsightly appearance. It is, therefore, an object of this invention to obviate the foregoing difficulties in replacing such rocker panels, by providing a rocker panel which may be positioned over the damaged panel, and which may be secured in place without the necessity of cutting, fitting or welding any of the parts. It is also an object of the invention to provide means for adding a trim molding, or decorative strip, to the car even when there has been no damage to the rocker panel. In practicing my invention I not only obviate the foregoing difficulties, but I provide a reinforced body structure, which combines a decorative and non-corrodible rug hold-down element, a step plate, and novel supporting means for the rocker panel, or a trim molding, which in itself could provide protection against damage to an existing rocker panel, by collision or the like.

The foregoing and other objects and advantages of the invention will become more apparent as the description proceeds, reference being made from time to time to the accompanying drawing, forming part of the within disclosure, in which drawing:

FIG. 1 is a fragmentary perspective view of an automobile, which is equipped with a device embodying the invention. In this view the door of the vehicle is removed.

FIG. 2 is a perspective view of a rocker panel, or trim strip, which is supported on the member illustrated in FIG. 3.

FIG. 3 is a perspective view of the member, combining the rug-hold-down element, step plate, door stop, and means for supporting the rocker panel, or trim strip, shown in FIG. 2.

FIG. 4 is a section taken substantially on the line 4—4 of FIG. 1.

FIG. 5 is a fragmentary section illustrating how the parts could be made in one piece.

Referring now more particularly to the drawing, it will be understood that in the embodiment herein disclosed, the reference character 7 indicates, in general, the body of a motor vehicle having a windshield 8, top 9, seat cushions 10, steering wheel 11, dash 12, brake 13, accelerator 14, wheel 15 and fender 16. The body 7, among other things includes such structural members as the floor 17, front door post 18, rear door post 19 and frame structure 20 (FIG. 4), to which the posts 18 and 19 are secured by welding, or other suitable means (not shown).

All of the elements just described constitute conventional parts of the motor vehicle, and form no part of the invention, except as combined with the structures which are described hereinafter. In addition to the elements hereinabove described, the vehicle body 7 also includes a conventional rocker panel 21 (FIG. 4), which is often times formed as an integrated part with the structural member 20, and in as much as the rocker panels 21, in the present day motor vehicles, are positioned close to the ground, they are easily damaged, and are subjected to a high degree of rust and corrosion.

In previous practice the repair or replacement of a rocker panel usually necessitated cutting out the panel, or a section thereof, and fitting and welding a new section in place. Such an operation is costly from the standpoint of labor and materials, and often leaves the vehicle body in a rather weakened condition in that area.

The present invention contemplates the elimination of such operations, and proposes to introduce a new method of replacing rocker panels, trim strips, and the like, along the lower portion of the vehicle bodies. In addition thereto, the invention contemplates the general re-enforcement of the vehicle body, in the area of the door opening and along the rocker panel area, by means of the structures which I will now describe. The members embodying the invention are shown in detail in FIGS. 2 and 3; and in FIGS. 1 and 4 the same members are shown as applied to the motor vehicle.

The principal member of the assembly is illustrated in FIG. 3, and is indicated in general, by the reference character 22. The member 22 is preferably a heavy metal plate, which is made of a non-corrodible material, such as cast aluminum, stainless steel, or other material, which will not be damaged by rust or corrosion. The member 22 is of such thickness and strength, that it serves as a general re-enforcing structural member when set in position as shown in FIG. 1, and secured to the doorposts 18 and 19, and the structural member 20 (FIG. 4), by means of machine screws 23, or other suitable means. The machine screws 23 are extended through openings 24, formed in the member 22, as shown in FIG. 3. The member 22 (FIGS. 3 and 4) is formed along one longitudinal edge with an inverted channel-like member 25, the edge 26 of which forms a hold-down element for the floor mat, or rug 27, which in conventional practice lies on top of the floor 17. The central portion 28 of the member 22 terminates at either end, as at 29, in up-turned ends, which are preferably secured to the end posts 18 and 19. The surface of the central portion 28 is ribbed, as at 30, or may be knurled, or otherwise treated in a non-slip manner, and serves as a step-plate for the vehicle. The outside longitudinal edge of the central portion 28 has a depending flange 31, which has a lateral extension 32, which terminates in a longitudinal channel 33. The angle formed by the elements 31 and 32 serves as a door stop for receiving the door 34 (FIG. 4). The channel 33 serves as means for receiving and supporting the downturned edge 35 (FIG. 4), of the rocker panel, or trim molding 36, the lower edge of which is preferably inturned, as at 37, and apertured, as at 37A, for receiving screws 38 or other suitable means, by which it is secured to the structural member 39, which together with the members 20 and 21 form integral parts of the original body structure of the vehicle. The invention also contemplates securing the member 22, by welding, directly to the frame member of the vehicle, while the vehicle is being assembled in the factory. When so secured to the frame, it would serve even more structurally than when attached as hereinabove described; however, it would serve in all other respects, as described hereinabove.

Although I have disclosed herein a rocker panel, or trim molding, which is removable from the step plate portion of the device, it is within the contemplation of the invention to make the two parts as an integral stamping, as shown in FIG. 5, wherein 31a and 32a are the door stop and 36a is the rocker panel or trim molding.

It is believed that the operation of the device is obvious from the foregoing description.

Having described my invention, what I claim and desire to secure by Letters Patent is:

1. A replaceable rocker panel for a vehicle body having door openings therein and a step plate, comprising a length of material extending rearwardly to the rear wheel housing of the vehicle, and having an upwardly projecting portion adjacent at least one door opening of the body, said projecting portion having a flanged edge hooked over an upturned outer edge of said step plate.

2. A cover member for the rocker panel of a conventional vehicle body having door openings therein and a step plate, comprising a length of material extending over the full length of said rocker panel and rearwardly to and contacting the rear wheel housing of the vehicle, and having an upwardly projecting portion overlying at least a portion of said step plate and means to secure said overlying portion to said step plate.

3. A cover member for the rocker panel of a conventional vehicle body having door openings therein and a step plate, comprising a length of material extending over the full length of said rocker panel and rearwardly to and contacting the rear wheel housing of the vehicle, and having an upwardly projecting portion overlying at least a portion of said step plate and means to secure said overlying portion to said step plate, and means to secure said cover member to the said vehicle body.

References Cited in the file of this patent

UNITED STATES PATENTS

| | | |
|---|---|---|
| 2,012,057 | Swallow | Aug. 20, 1935 |
| 2,132,471 | Hoffman | Oct. 11, 1938 |
| 2,208,723 | Doty | July 23, 1940 |
| 2,234,781 | Schjolin | Mar. 11, 1941 |
| 2,482,906 | Goodwin et al. | Sept. 27, 1949 |